United States Patent
Stolyar et al.

(10) Patent No.: US 9,525,727 B2
(45) Date of Patent: Dec. 20, 2016

(54) EFFICIENT AND SCALABLE PULL-BASED LOAD DISTRIBUTION

(71) Applicant: ALCATEL-LUCENT USA, INC., Murray Hill, NJ (US)

(72) Inventors: Aleksandr Stolyar, Basking Ridge, NJ (US); Thomas Woo, Short Hills, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 228 days.

(21) Appl. No.: 14/300,625

(22) Filed: Jun. 10, 2014

(65) Prior Publication Data
US 2015/0358402 A1     Dec. 10, 2015

(51) Int. Cl.
*H04L 12/803*     (2013.01)
*H04L 29/08*      (2006.01)
*G06F 9/50*       (2006.01)

(52) U.S. Cl.
CPC ............ *H04L 67/1008* (2013.01); *G06F 9/50* (2013.01); *G06F 9/505* (2013.01); *G06F 9/5027* (2013.01);
(Continued)

(58) Field of Classification Search
CPC .. G06F 1/206; G06F 17/30563; G06F 9/5033; G06F 9/5061; G06F 9/5083; G06F 9/50; G06F 9/5027; G06F 9/5072; H04L 41/50; H04L 67/1008; H04L 67/1019; H04L 47/125; H04N 7/15
See application file for complete search history.

(56) References Cited

U.S. PATENT DOCUMENTS

2005/0033858 A1    2/2005  Swildens
2008/0275916 A1*  11/2008  Bohannon ......... G06F 17/30563
(Continued)

FOREIGN PATENT DOCUMENTS

EP     0232509 A2     8/1987

OTHER PUBLICATIONS

International Search Report and Written Opinion for PCT/US2015/034173 dated Sep. 16, 2015.
(Continued)

*Primary Examiner* — Le Luu
(74) *Attorney, Agent, or Firm* — Kramer & Amado, P.C.

(57) ABSTRACT

Various embodiments relate to a method, device, and machine-readable storage medium including: receiving a work request for distribution among a plurality of servers; selecting a server of the plurality to receive the work request including: determining whether at least one of the plurality of servers has previously indicated a capacity for additional work, and when at least one has indicated such capacity, selecting the server from a set of servers identified from the plurality as having previously indicated a capacity for additional work; and transmitting the work request to the server. Various embodiments relate to a method, device, and machine-readable storage medium including: maintaining and processing a plurality of requests; determining, based on the plurality of requests, that the server has capacity to process at least one additional request; selecting a load distributor from a plurality of load distributors; and transmitting an indication of capacity to the load distributor.

20 Claims, 4 Drawing Sheets

(52) U.S. Cl.
CPC .......... *G06F 9/5072* (2013.01); *H04L 47/125* (2013.01); *H04L 67/1031* (2013.01); *G06F 2209/503* (2013.01)

(56) References Cited

U.S. PATENT DOCUMENTS

| | | | |
|---|---|---|---|
| 2009/0037367 A1* | 2/2009 | Wein | G06F 9/5061 |
| 2010/0036903 A1 | 2/2010 | Ahmad et al. | |
| 2010/0095184 A1* | 4/2010 | Zuckerman | H04L 67/1008 714/751 |
| 2010/0169477 A1* | 7/2010 | Stienhans | G06F 9/5083 709/224 |
| 2010/0313204 A1* | 12/2010 | Haugh | G06F 1/206 718/105 |
| 2011/0252127 A1* | 10/2011 | Iyengar | G06F 9/5033 709/224 |
| 2012/0173709 A1* | 7/2012 | Li | G06F 9/5061 709/224 |
| 2013/0132553 A1* | 5/2013 | Stratton | H04L 41/50 709/223 |
| 2014/0267571 A1* | 9/2014 | Periyannan | H04N 7/15 348/14.08 |
| 2014/0280866 A1* | 9/2014 | Lyon | H04L 67/1019 709/224 |

OTHER PUBLICATIONS

Badonnel, et al., "Dynamic Pull-Based Load Balancing for Autonomic Servers", IEEE, 2008, 751-754.

Lu, et al., "A novel load balancing algorithm for dynamically scalable web services", Performance Evaluation, vol. 68, No. 11, 2011, 1056-1071.

Vvedenskaya, et al., "Queueing system with selection of the shortest of two queues: an asymptotic approach", Probl. Inf. Transm., 32:1, 1996, 20-34.

Remi, "Dynamic Pull-Based Load Balancing for Automatic Servers", IEEE, 2008, 751-754.

Yi Lu, "A novel load balancing algorithm for dynamically", 2011, 1-16.

N. D. Vvedenskaya; Queueing System with Selection of the Shortest of Two Queues; 1996, 32:1, 20-34; English abstract.

Н. Д. Введенская1 ; СИСТЕМА ОБСЛУЖИВАНИЯ С ВЫБОРОМ НАИМЕНЬШЕЙ ИЗ ДВУХ ОЧЕРЕДЕЙ - АСИМПТОТИЧЕСКИЙ ПОДХОД ; © 1996; pp. 394-395.

* cited by examiner

EFFICIENT AND SCALABLE PULL-BASED LOAD DISTRIBUTION

TECHNICAL FIELD

Various exemplary embodiments disclosed herein relate generally to load distribution and, more particularly but not exclusively, to distribution of work requests in large-scale cloud-based systems.

BACKGROUND

The problem of load balancing is becoming increasingly relevant with the advent of cloud computing. The wide variety in application requirements and scale in cloud computing call for multiple unique load balancing approaches tailored to fit the individual needs of each application. For example, the "power-of-d-choices" load balancing algorithm (where d is a positive integer) provides low job waiting and response time at the cost of high signaling message overhead. The "join-idle-queue" load balancing algorithm, on the other hand, has low signaling message overhead but is only applicable in systems where each server can process one job at a time or where maximum processing rate is achieved in each server by a single job. In these specific cases, the join-idle-queue algorithm will provide good performance, but will not be ideal in other cases.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a system for processing work requests, the system including: a plurality of load distributors; and a plurality of servers, wherein a server of the plurality of servers is configured to: process a plurality of current work requests received by the server, determine, based on the plurality of current work requests, that the server has capacity to process at least one additional work request, select a load distributor from the plurality of load distributors, and transmit an indication of capacity for additional work to the selected load distributor, and wherein the selected load distributor is configured to: receive an incoming work request, select a server of the plurality of servers to receive the incoming work request, including: determining whether at least one of the plurality of servers has previously sent an indication of capacity for additional work to the selected load distributor, identify a set of servers of the plurality of servers, wherein each server in the set of servers has previously indicated a capacity for additional work, and when at least one of the plurality of servers has previously indicated a capacity for additional work, selecting the server from a set of servers identified from the plurality of servers as having previously indicated a capacity for additional work; and transmit the work request to the selected server.

Various embodiments described herein relate to a non-transitory machine-readable storage medium encoded with instructions for execution by a load distributor device, the non-transitory machine-readable medium including: instructions for receiving a work request for distribution among a plurality of servers; instructions for selecting a server of the plurality of servers to receive the work request including: instructions for determining whether at least one of the plurality of servers has previously indicated a capacity for additional work, instructions for identifying a set of servers of the plurality of servers, wherein each server in the set of servers has previously indicated a capacity for additional work, instructions for, when at least one of the plurality of servers has previously indicated a capacity for additional work, instructions for selecting the server from a set of servers identified from the plurality of servers as having previously indicated a capacity for additional work; and instructions for transmitting the work request to the selected server.

Various embodiments described herein relate to a load distributor device including: a memory device; and a processor in communication with the memory device, the processor being configured to: receive a work request for distribution among a plurality of servers, select a server of the plurality of servers to receive the work request, including determining whether at least one of the plurality of servers has previously indicated a capacity for additional work, identifying a set of servers of the plurality of servers, wherein each server in the set of servers has previously indicated a capacity for additional work, and when at least one of the plurality of servers has previously indicated a capacity for additional work, selecting the server from a set of servers identified from the plurality of servers as having previously indicated a capacity for additional work; and transmit the work request to the selected server.

Various embodiments described herein relate to a method performed by a load distributor device, the method including: receiving a work request for distribution among a plurality of servers; selecting a server of the plurality of servers to receive the work request including: determining whether at least one of the plurality of servers has previously indicated a capacity for additional work, identifying a set of servers of the plurality of servers, wherein each server in the set of servers has previously indicated a capacity for additional work and when at least one of the plurality of servers has previously indicated a capacity for additional work, selecting the server from a set of servers identified from the plurality of servers as having previously indicated a capacity for additional work; and transmitting the work request to the selected server.

Various embodiments additionally include instructions for receiving a pull request message from a server of the plurality of servers; and instructions for establishing a pull indication associated with the server based on receiving the pull request, wherein the instructions for determining whether at least one of the plurality of servers has previously indicated a capacity for additional work include instructions for determining whether any pull indication is currently set for any of the plurality of servers.

Various embodiments are described wherein the pull indication includes a bit within a bitmap, wherein the bit occupies a position within the bitmap corresponding to the server.

Various embodiments additionally include instructions for unsetting a pull indication associated with the selected server based on selecting the selected server to receive the work request.

Various embodiments additionally include instructions for identifying a stale pull indication as being expired; and instructions for unsetting the stale pull indication based on identifying the stale pull indication as being expired.

Various embodiments are described wherein the instructions for selecting a server of the plurality of servers to receive the work request further include: instructions for, when none of the plurality of servers has previously indicated a capacity for additional work, selecting the server from the full plurality of servers.

Various embodiments are described wherein the instructions for, when at least one of the plurality of servers has previously indicated a capacity for additional work, selecting the server from a set of servers identified from the plurality of servers as having previously indicated a capacity for additional work include: selecting the server from the set of servers using a uniform random selection algorithm.

Various embodiments described herein relate to a non-transitory machine-readable storage medium encoded with instructions for execution by a server device, the non-transitory machine-readable medium including: instructions for maintaining and processing a plurality of current work requests; instructions for determining, based on the plurality of current work requests, that the server has capacity to process at least one additional work request; instructions for selecting a load distributor from a plurality of load distributors; and instructions for transmitting an indication of capacity for additional work to the selected load distributor. Various embodiments described herein relate to a server device configured to perform steps similar to such instructions and to a method including steps similar to such instructions.

Various embodiments are described wherein the instructions for selecting a load distributor from a plurality of load distributors include instructions for selecting the load distributor according to a uniformly random load distribution algorithm.

Various embodiments are described wherein the instructions for determining, based on the plurality of current work requests, that the server has capacity to process at least one additional work request includes instructions for determining whether a current queue depth associated with the plurality of current work requests is below a predetermined capacity threshold.

Various embodiments additionally include instructions for decreasing the current queue depth when a work request is completed, wherein the instructions for determining whether a current queue depth associated with the plurality of current work requests is below a predetermined capacity threshold are configured to be executed in response to decreasing the current queue depth.

Various embodiments are described wherein the instructions for determining whether a current queue depth associated with the plurality of current work requests is below a predetermined capacity threshold include instructions for comparing the number the plurality of current work requests to the capacity threshold.

Various embodiments additionally include instructions for monitoring performance of the server; and instructions for setting the predetermined capacity threshold based on the monitored performance of the server.

Various embodiments additionally include instructions for periodically performing the instructions for setting the predetermined capacity threshold based on the monitored performance of the server.

Various embodiments are described wherein the instructions for transmitting an indication of capacity for additional work to the selected load distributor include instructions for transmitting a pull request message to the selected load distributor via a network.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

While many load distribution schemes are known, there is still need for improvement. For example, in a large scale service system with many (and possibly heterogenous) servers, processing jobs, and multiple load distributors, existing load distribution algorithms are not ideal. In particular, when applied in this and similar contexts, existing load distribution algorithms are insufficient in some or all design criteria such as, for example, maximization of overall system processing capacity, minimization of job waiting (response) time, and minimization of signaling message overhead between load distributors and servers. Accordingly, there is a need for an improved load balancing algorithm that exhibits enhanced performance in these and other deployments.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
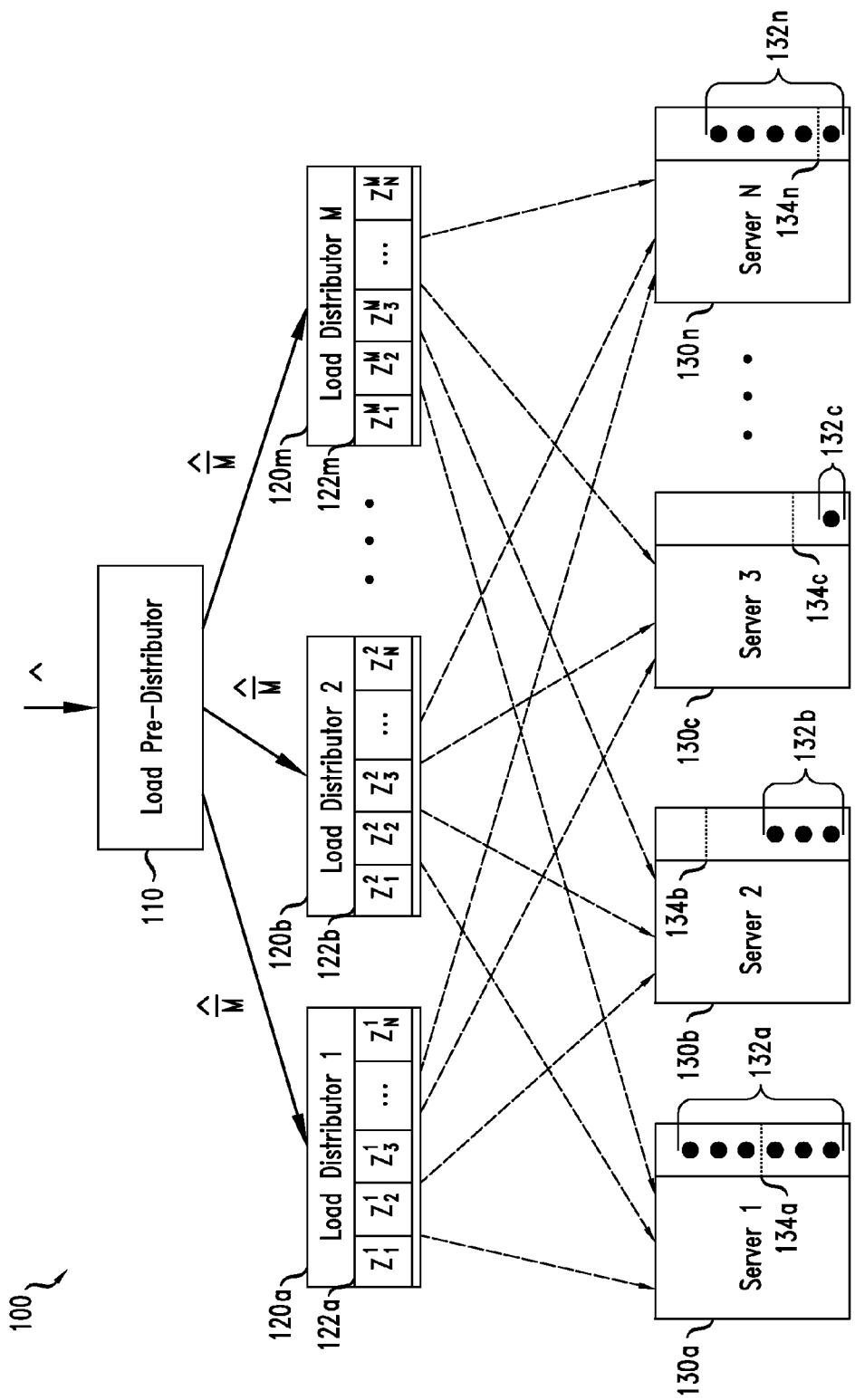
FIG. 1 illustrates an exemplary network for distributing and processing a workload.

FIG. 1 illustrates an exemplary network 100 for distributing and processing a workload. The network may correspond to a multi-server application such as, for example, a cloud application. As shown, the network includes a load pre-distributor 110, multiple load distributors 120, and multiple servers 130. It will be apparent that each device 110, 120, 130 may include various hardware devices such as, for example, servers, blades, virtual machines running on datacenter hardware, personal computers, laptops, tablets, or any other device that may be configured to perform the functions herein.

As shown, the load pre-distributor 110 receives a stream of jobs at average rate $\Lambda$, or workload $\Lambda$, to be distributed throughout the application. For example, the load pre-distributor 110 may be a front-end of the application implemented by the network 100. As shown, the load pre-distributor 110 distributes the workload Λ roughly evenly among the load distributors 120, with each of the M load distributors 120 receiving about Λ/M of the workload. The load pre-distributor 110 may use virtually any distribution algorithm to achieve such a distribution such as, for example, a round robin algorithm or a uniform random distribution algorithm. In various alternative embodiments, the load pre-distributor 110 may be omitted entirely and the requests forming the workload Λ may be transmitted directly to the load distributors 120 by the requesting devices (not shown), so as to provide approximately uniform distribution of workload Λ among the load distributors 120 without a central load pre-distributor 110.

The load distributors 120 receive approximately a portion Λ/M of the workload Λ and then further distribute that portion amongst the N servers 130 of the application for processing. As shown, each load distributor 120 may send work to any server 130; in various alternative embodiments, some or all of the load distributors 120 may only send work to respective subsets of the servers 130. In various embodiments, the number of servers N is significantly larger than the number of load distributors M. For example, the network may include tens of load distributors 120 and thousands or tens of thousands of servers 130.

The servers 130 receive individual jobs, or "work requests," from the various load distributors 120 and process the received work requests. As shown, each server 130 maintains a queue that holds a discrete number of work requests 132 that are currently being processed or are in line to be processed. The processing performed by the servers will vary based on the application being proved by the network 100. For example, where the application is a distributed computing application arranged to compute and return a hash value of a piece of data provided in the request, the servers 130 will process each work request by extracting the data from the request, performing the hash function, and transmitting the resultant value back to the requestor or some other entity. Various other forms of processing work requests for this or other applications will be apparent.

As shown, the server pool 130 is a heterogeneous server pool wherein the servers 130 are provided with different processing capabilities. For example, server 1 130a may be able to process three work requests simultaneously while server 2 may be able to process five work requests simultaneously. Various other potential differences in server capabilities will be apparent. Further, in various alternative embodiments, the server pool 130 may be homogeneous, including roughly similar processing capabilities.

According to the methods and systems described herein, the load distributors 120 and servers 130 participate in a novel load distribution scheme. According to one aspect of the load balancing scheme, the servers 130 are able to report to one or more load distributors 120 when that server 130 is able to accept additional work requests. For example, each server 130 may monitor the current queue depth 132 as compared to some threshold 134. When the queue depth 132 decreases and is found to be below the threshold 132, the server may send a pull request message back to one or more load distributors 120 indicating a capacity for additional work.

The thresholds 134 may be set according to any method appropriate for determining a desired queue fill level; further, the methods employed for setting the queue level may vary among the servers. According to some embodiments, a threshold 134 may be set by a human user such as an application administrator or may be dynamically configured by the respective servers 130 based on performance data, recorded feedback, or any other information. Such dynamic configuration may set the threshold 134 once on application establishment or may periodically or continually adjust the threshold 134. In some embodiments, the threshold 134 is set to equal the number of work requests that the associated server 130 is capable of processing simultaneously or simultaneously without impacting performance. Various additional or alternative metrics for use in setting the threshold 134 will be apparent.

When the queue depth 132 decreases and is found to be below the threshold 134, the server sends some indication of capacity to perform additional work to one or more load distributors 120 such as, for example, a pull request message. The pull request message may be formed according to virtually any standard or protocol as long as the servers 130 and load distributors 120 are able to understand the message. For example, in embodiments where the load distributors 120 and servers 130 communicate via TCP/IP protocols, the pull request message may be a TCP/IP packet including a payload or special header field indicating that the message is a pull request message.

According to some embodiments, the server 130 selects a single load distributor 120 to which the pull request message will be transmitted. For example, the server 130 may employ a round robin or uniformly random distribution algorithm to select a single load distributor 120 from the entire pool or a subset thereof. In other embodiments, the server 130 may send the pull request message to more than one load distributor based on a load distribution algorithm such as those explained above.

According to another aspect of the load distribution methods described herein, the load distributors 120 utilize information about reported capacity from the server 130 to direct work requests with a preference for servers 130 having capacity. For example, each load distributor 120 may maintain a bitmap 122 that includes a bit for each server 130. When a load distributor 120 receives a pull request message from a server 130, the load distributor 120 may set the bit corresponding to that server 130, thereby creating a record that the server 130 has indicated a capacity to take on additional work requests. Various alternative structures other than a bitmap will be apparent. For example, a load distributor 120 may maintain a table or list of those servers that have sent pull request messages.

In the embodiment of FIG. 1, upon receiving a work request, the load distributor 120 begins to select a server 130 to receive the work request by determining whether the bitmap 122 includes any set bits. If so, then at least one server has indicated a capacity for additional work and will be given preference for the work request. The load balancer then chooses a server from among those associated with set bits in the bitmap to receive the work request. For example, the load distributor may utilize a round robin or uniform random load distribution algorithm to select a server from this subset. The load distributor 120 then sends the work request to the selected server 130 and unsets the bit associated with that server 130. If, on the other hand, the bitmap includes no set bits, the load distributor 120 may simply distribute the work request to one of the servers selected from the entire pool 130 according to a load distribution method such as a round robin or uniform random load distribution algorithm.

Figure 2:
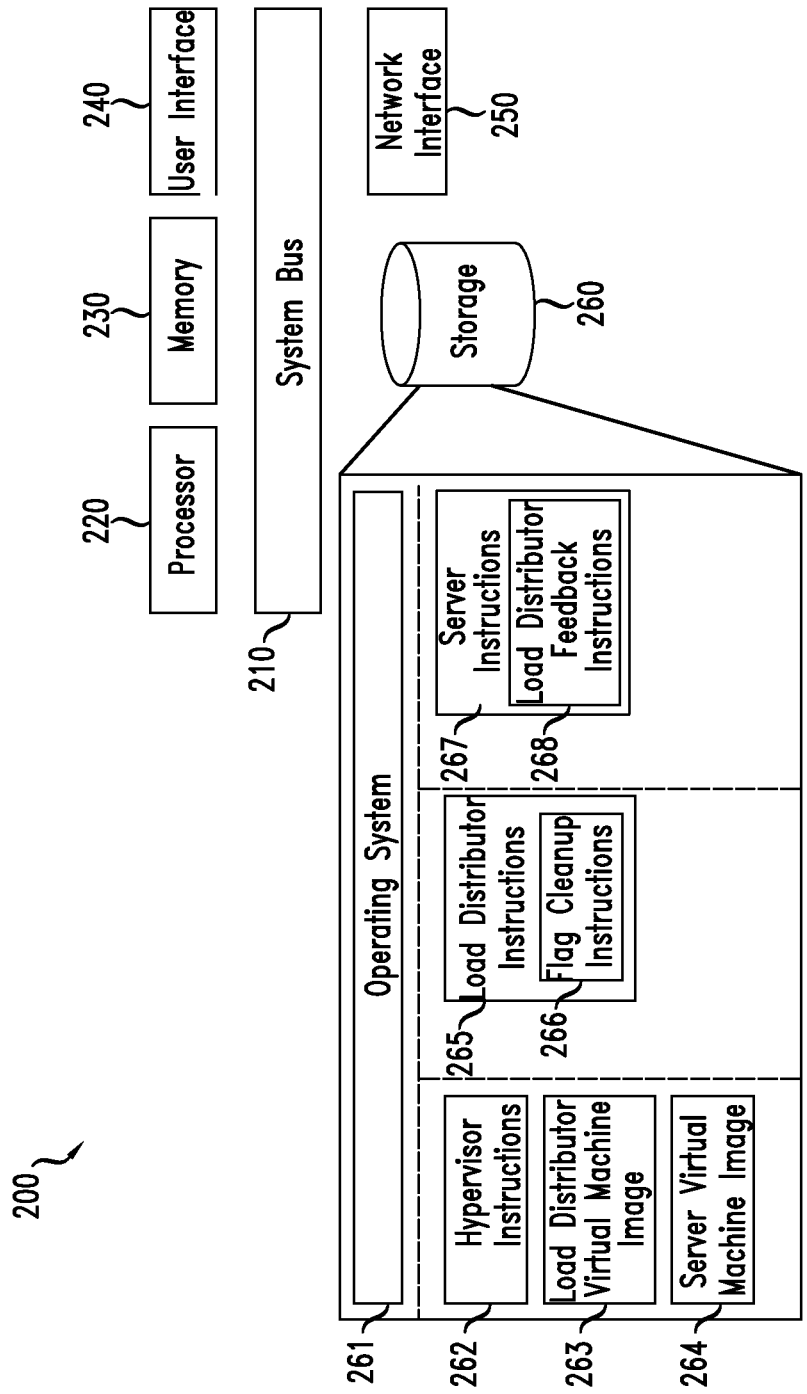
FIG. 2 illustrates an exemplary hardware diagram for implementing a load distributor device or a server.

FIG. 2 illustrates an exemplary hardware diagram 200 for implementing a load distributor device or a server. The exemplary hardware 200 may correspond to one or more load balancers 120 or servers 130 of FIG. 1. As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, field programmable gate array (FPGA), application-specific integrated circuit (ASIC), or other similar devices.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261.

In embodiments where the device 200 is a device within a cloud computing system, the storage 260 may also store hypervisor instructions 262 for managing the operation of various virtual machines. Where the device 200 implements one or more cloud-based load distributors, the storage 260 may store one or more load distributor virtual machine images 263. In various embodiments, the load distributor virtual machine image 263 may implement the functionality described below with respect to the load distributor instructions 265. Where the device 200 implements one or more cloud-based servers, the storage 260 may additionally or alternatively store one or more server virtual machine images 264. In various embodiments, the server virtual machine image 264 may implement the functionality described below with respect to the server instructions 267.

In embodiments where the device 200 is a dedicated load distributor device, the storage 260 may store load distributor instructions 265 for performing the various functionalities described herein with respect to load distributors. As will be explained below, the load distributor instructions 265 may further include flag cleanup instructions 266 for unsetting or otherwise cleaning up "stale" indications of capacity received from servers.

In embodiments where the device 200 is a dedicated server device, the storage 260 may store server instructions 267 for processing work requests. It will be apparent that the specifics of the server instructions 267 will vary based on the application being implemented. The server instructions 267 further include load distributor feedback instructions 268 for sending capacity indications back to load distributors and for implementing other functionalities described herein with respect to servers.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

Figure 3:
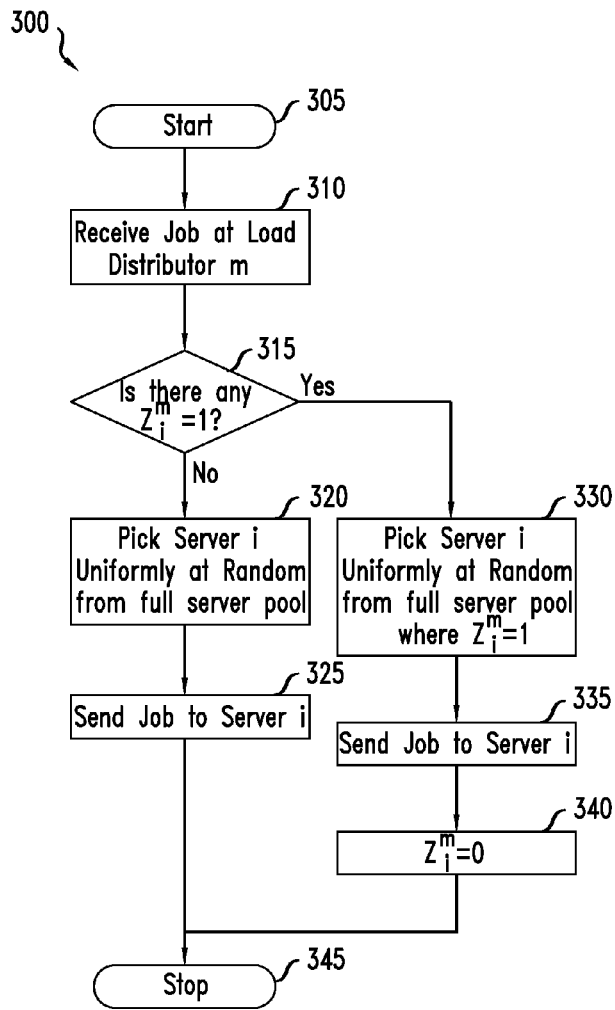
FIG. 3 illustrates an exemplary method for dispatching a job to a server.

FIG. 3 illustrates an exemplary method 300 for dispatching a job to a server. The method 300 may be performed by one or more load distributors 120 of FIG. 1. The method 300 begins in step 305 and proceeds to step 310 where the load distributor (identified by the index "m") receives a work request from an initial load distributor or elsewhere. Next, in step 315, the load distributor determines whether any indications of capacity are currently set. For example, in embodiments where the load distributor maintains a bitmap to represent received capacity indications such as pull request messages, the load distributor may determine whether the bitmap includes any set bits. If no bits are set, the method proceeds to step 320 where the load distributor picks a server from the full server pool. For example, the load distributor may use a round robin or uniformly random distribution algorithm to select a specific server, identified by the index "i." Then, in step 325, the load distributor sends the work request to the selected server, and the method ends in step 345.

If, on the other hand, at least one bit in the bitmap is set, the method proceeds from step 315 to step 330 where the load distributor picks a server from only those servers associated with a set bit in the bitmap. For example, the load distributor may use a round robin or uniformly random distribution algorithm to select a specific server from this subset of the total pool, identified by the index "i." Then, in step 335, the load distributor sends the work request to the selected server. The load distributor then unsets the bit associated with the selected server in the local bitmap and the method ends in step 345. Various modifications will be apparent to adapt methods to different systems. For example, where the load distributor uses a table or list of received capacity indications, the load distributor may simply select a server from that table or list and delete the entry of the selected server.

Figure 4:
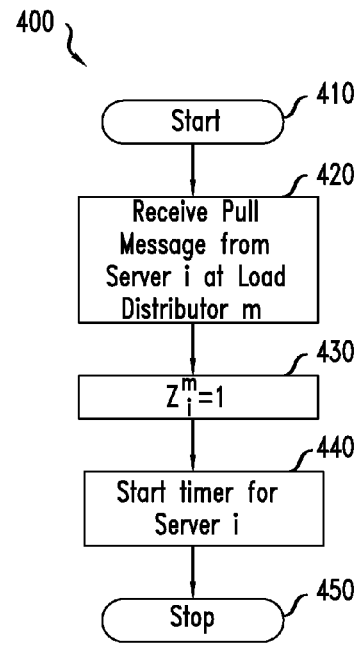
FIG. 4 illustrates an exemplary method for processing a pull message from a server.

FIG. 4 illustrates an exemplary method 400 for processing a pull message from a server. The method 400 may be performed by one or more load distributors 120 of FIG. 1. The method begins in step 410 and proceeds to step 420 where a load distributor, identified by index "m," receives and recognizes a pull message from a particular server identified by index "i." Next, in step 430, the load balancer sets the bit associated with server i in the local bitmap in response to receiving the pull request.

In various embodiments, the load balancer may also periodically "clean up" capacity indications that are sufficiently old to be considered "stale." In such embodiments, the method may proceed to step 440 where the load distributor starts a timer associated with server i. The timer may be a preconfigured amount of time to let the set bit "live" prior to being unset if not already unset through operation of a step such as step 340 of method 300. In various embodiments, step 340 of method 300 may additionally include stopping or otherwise cleaning up this timer. Subsequent use of the timer will be explained in greater detail below with respect to FIG. 5. The method then proceeds to end in step 450.

Figure 5:
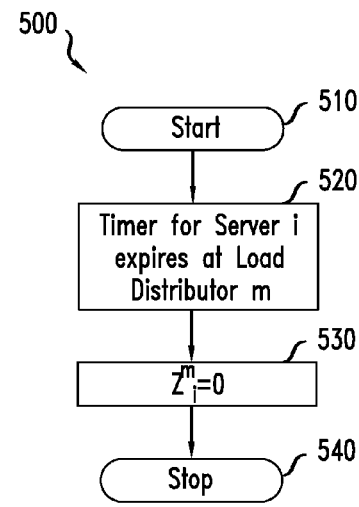
FIG. 5 illustrates an exemplary method for clearing expired pull indications.

FIG. 5 illustrates an exemplary method 500 for clearing expired pull indications. The method 400 may be performed by one or more load distributors 120 of FIG. 1. The method 500 begins in step 510 and proceeds to step 520 where the load distributor determines that a previously starter timer (such as a timer set according to step 440 of method 400) has expired for a particular server identified by index "i." Next, in step 530, the load distributor unsets the bit associated with server i within the local bitfield. The method then proceeds to end in step 540.

It will be apparent that various alternative methods for cleaning up "stale" capacity indications may be employed. For example, according to some alternative embodiments, rather than keeping a timer for each server or for each current capacity indication, the load balancer may periodically unset some or all current capacity indications. In some such embodiments, the load balancer may, at periodic intervals, choose a number of bits within the bitmap to unset uniformly at random. In some embodiment, the number of bits to unset may be a static number or may be based on the total number of bits currently set (e.g., a set percentage of the set bits may be unset each interval, or a number of bits to unset may be associated with different threshold numbers of total set bits). Various additional modifications will be apparent.

Figure 6:
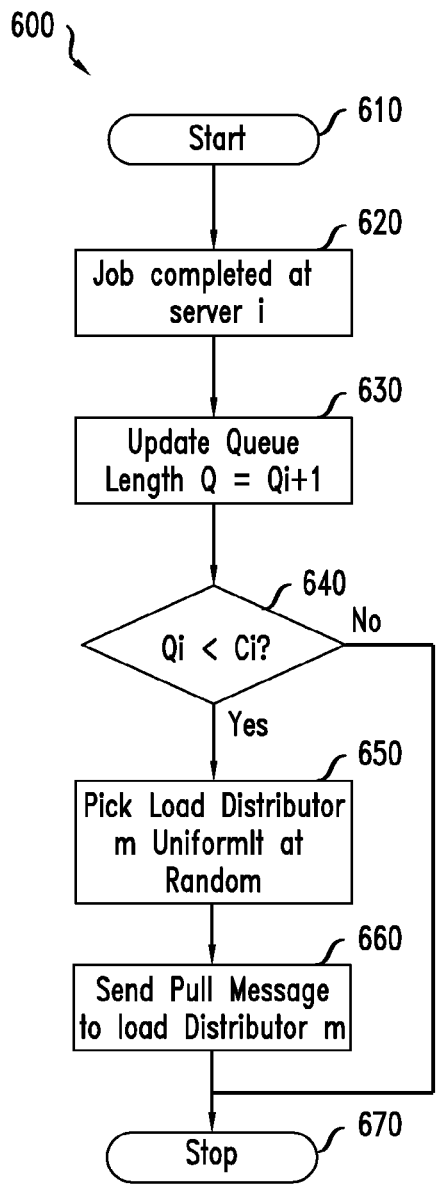
FIG. 6 illustrates an exemplary method for evaluating a server current load.

FIG. 6 illustrates an exemplary method 600 for evaluating a server current load. The method 400 may be performed by one or more server 130 of FIG. 1. The method begins in step 610 and proceeds to step 620 where a server, identified by the index "i," finishes processing a work request and, in some applications, transmits a response message to the requestor or another entity. Next, in step 630, the server decrements the queue length to reflect the fact that a work request has been completed. Next, in step 640, the server checks to see whether it now has available capacity based on the updated queue length. For example, the server may determine whether the queue length is now less than a capacity threshold. As explained above, the capacity threshold may be determined according to virtually any method such as, for example, the number of work requests that the server is capable of processing simultaneously without a negative impact on performance. If the queue is not yet below capacity, the method 600 proceeds directly to end in step 670.

If, on the other hand, the server now has excess capacity, the method 600 proceeds from step 640 to step 650 where the server selects a load distributor to which the capacity will be reported. For example, the server may employ a round robin or uniformly random distribution algorithm to select a single load distributor from the pool of all load distributors belonging to the application. Various modifications will be apparent in view of the foregoing. The server then sends a pull message to the selected load distributor in step 660 and the method proceeds to end 670. The selected load distributor may then process the received pull request message, for example, according to method 400.

Figure 7:
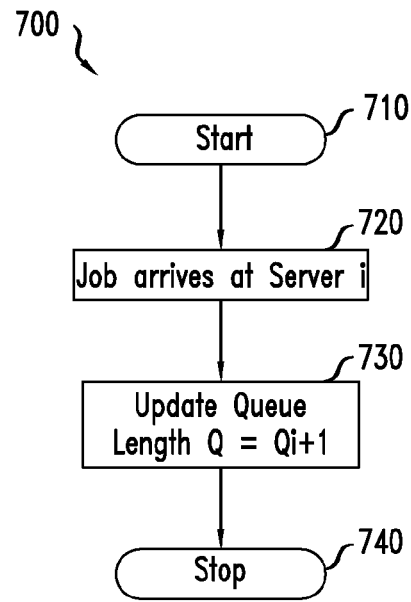
FIG. 7 illustrates an exemplary method for receiving a job from a load distributor.

FIG. 7 illustrates an exemplary method 700 for receiving a job from a load distributor. The method 700 may be performed by one or more server 130 of FIG. 1. The method begins in step 710 and proceeds to step 720 where a server, identified by the index "i," receives a work request. The server then increments the queue length to reflect the additional work request in step 730 and the method 700 proceeds to end in step 740.

It will be apparent that, while various embodiments are described herein as measuring queue depth and capacity based on number of requests, various alternative metrics may be utilized. For example, a type of request may be alternatively or additionally taken into account where the servers are capable of processing different types of requests. As another example, the size of the request or an estimation of processing cycles, time, or other resources necessary to serve the request may be utilized to gauge queue length and capacity. Various additional or alternative metrics will be apparent.

According to the foregoing, various embodiments provide improved load balancing methods that are useful in a variety of contexts including large-scale systems including many heterogeneous servers and load distributors. In particular, by providing pull messages from servers to load balancers when the load balancers have unused capacity, new work requests may be directed with a preference for servers that have such unused capacity. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a load distributor device, the non-transitory machine-readable medium comprising:
   instructions for receiving a work request for distribution among a plurality of servers;
   instructions for selecting a server of the plurality of servers to receive the work request comprising:
      instructions for determining whether at least one of the plurality of servers has previously indicated a capacity for additional work in a pull request message,
      instructions for identifying a set of servers of the plurality of servers, wherein each server in the set of servers has previously indicated the capacity for additional work,
      instructions for, when at least one of the plurality of servers has previously indicated the capacity for additional work, selecting the server from the set of servers identified from the plurality of servers as having previously indicated the capacity for additional work; and
   instructions for transmitting the work request to the selected server.

2. The non-transitory machine-readable storage medium of claim 1, further comprising:
   instructions for establishing a pull indication associated with the server based on receiving the pull request message, wherein the instructions for determining whether at least one of the plurality of servers has previously indicated the capacity for additional work comprise:
      instructions for determining whether any pull indication is currently set for any of the plurality of servers.

3. The non-transitory machine-readable storage medium of claim 2, wherein the pull indication comprises a bit within a bitmap and the bit occupies a position within the bitmap corresponding to the server.

4. The non-transitory machine-readable storage medium of claim 2, further comprising:
   instructions for unsetting the pull indication associated with the selected server based on selecting the selected server to receive the work request.

5. The non-transitory machine-readable storage medium of claim 2, further comprising:
   instructions for identifying a stale pull indication as being expired; and
   instructions for unsetting the stale pull indication based on identifying the stale pull indication as being expired.

6. The non-transitory machine-readable storage medium of claim 1, wherein the instructions for selecting the server of the plurality of servers to receive the work request further comprise:
   instructions for, when none of the plurality of servers has previously indicated the capacity for additional work, selecting the server from the full plurality of servers.

7. The non-transitory machine-readable storage medium of claim 1, wherein the instructions for, when at least one of the plurality of servers has previously indicated the capacity for additional work, selecting the server from the set of servers identified from the plurality of servers as having previously indicated the capacity for additional work comprise:
   selecting the server from the set of servers using a uniform random selection algorithm.

8. A load distributor device comprising:
   a memory device; and
   a processor in communication with the memory device, the processor being configured to receive a work request for distribution among a plurality of servers, select a server of the plurality of servers to receive the work request, determine whether at least one of the plurality of servers has previously indicated a capacity for additional work, identify a set of servers of the plurality of servers, wherein each server in the set of servers has previously indicated the capacity for additional work, and when at least one of the plurality of servers has previously indicated the capacity for additional work in a pull request message, select the server from the set of servers identified from the plurality of servers as having previously indicated the capacity for additional work, and transmit the work request to the selected server.

9. The load distributor device of claim 8, wherein the processor is further configured to establish a pull indication associated with the server based on receiving the pull request message, wherein, in determining whether at least one of the plurality of servers has previously indicated the capacity for additional work, the processor is configured to determine whether any pull indication is currently set for any of the plurality of servers.

10. The load distributor device of claim 9, wherein the pull indication comprises a bit within a bitmap stored in the memory device and the bit occupies a position within the bitmap corresponding to the server.

11. The load distributor device of claim 9, wherein the processor is further configured to unset the pull indication associated with the selected server based on selecting the selected server to receive the work request.

12. The load distributor device of claim 9, wherein the processor is further configured to identify a stale pull indication as being expired and unset the stale pull indication based on identifying the stale pull indication as being expired.

13. The load distributor device of claim 8, wherein, in selecting the server of the plurality of servers to receive the work request, the processor is configured to, when none of the plurality of servers has previously indicated the capacity for additional work, select the server from the full plurality of servers.

14. The load distributor device of claim 8, wherein, in selecting the server from the set of servers identified from the plurality of servers as having previously indicated the capacity for additional work, the processor is configured to select the server from the set of servers using a uniform random selection algorithm.

15. A method performed by a load distributor device, the method comprising:
   receiving a work request for distribution among a plurality of servers;
   selecting a server of the plurality of servers to receive the work request comprising:

determining whether at least one of the plurality of servers has previously indicated a capacity for additional work in a pull request message, identifying a set of servers of the plurality of servers, wherein each server in the set of servers has previously indicated the capacity for additional work, and when at least one of the plurality of servers has previously indicated the capacity for additional work, selecting the server from the set of servers identified from the plurality of servers as having previously indicated the capacity for additional work; and transmitting the work request to the selected server.

16. The method of claim 15, further comprising:

establishing a pull indication associated with the server based on receiving the pull request message, wherein determining whether at least one of the plurality of servers has previously indicated the capacity for additional work comprises:

determining whether any pull indication is currently set for any of the plurality of servers.

17. The method of claim 16, wherein the pull indication comprises a bit within a bitmap, and the bit occupies a position within the bitmap corresponding to the server.

18. The method of claim 16, further comprising unsetting the pull indication associated with the selected server based on selecting the selected server to receive the work request.

19. The method of claim 16, further comprising:

identifying a stale pull indication as being expired; and unsetting the stale pull indication based on identifying the stale pull indication as being expired.

20. The method of claim 15, wherein selecting the server of the plurality of servers to receive the work request further comprises:

selecting the server from the full plurality of servers when none of the plurality of servers has previously indicated the capacity for additional work.

* * * * *